US012649162B2

(12) United States Patent
Zong et al.

(10) Patent No.: US 12,649,162 B2
(45) Date of Patent: Jun. 9, 2026

(54) CURVED-SCREEN SHIELDING DEVICE

(71) Applicant: JIANGSU FAVORED NANOTECHNOLOGY CO., LTD., Wuxi (CN)

(72) Inventors: Jian Zong, Wuxi (CN); Fuen Sun, Wuxi (CN)

(73) Assignee: JIANGSU FAVORED NANOTECHNOLOGY CO., LTD., Jiangsu (CN)

( * ) Notice: Subject to any disclaimer, the term of this patent is extended or adjusted under 35 U.S.C. 154(b) by 435 days.

(21) Appl. No.: 18/269,638

(22) PCT Filed: Dec. 2, 2021

(86) PCT No.: PCT/CN2021/134979
§ 371 (c)(1),
(2) Date: Jun. 26, 2023

(87) PCT Pub. No.: WO2022/142991
PCT Pub. Date: Jul. 7, 2022

(65) Prior Publication Data
US 2024/0316586 A1 Sep. 26, 2024

(30) Foreign Application Priority Data
Dec. 28, 2020 (CN) .......................... 202011575625.2

(51) Int. Cl.
B05B 12/28 (2018.01)
G09F 9/30 (2006.01)

(52) U.S. Cl.
CPC ............... B05B 12/28 (2018.02); G09F 9/30 (2013.01); G06F 2203/04103 (2013.01)

(58) Field of Classification Search
CPC .. G06F 2203/04103; G09F 9/30; B05B 12/28
See application file for complete search history.

(56) References Cited

FOREIGN PATENT DOCUMENTS

| CN | 204570027 U | 8/2015 |
| CN | 109280897 A | 1/2019 |
| | (Continued) | |

OTHER PUBLICATIONS

Machine translation of CN 110699671 A (Year: 2020).*

(Continued)

*Primary Examiner* — Vishal I Patel
(74) *Attorney, Agent, or Firm* — pH IP Law

(57) ABSTRACT

A curved-screen shielding device is provided for shielding a curved screen assembly during a coating process. The curved-screen shielding device includes at least one template sleeve and a flexible sleeve, wherein the flexible sleeve includes a first accommodation space, and the template sleeve includes a second accommodation space. The curved screen assembly can be accommodated in the first accommodation space, and the flexible sleeve can be accommodated in the second accommodation space. At least one first through hole is configured at a corresponding position of the template sleeve and the flexible sleeve, and a coating monomer can reach a coating area of the curved screen assembly through the at least one first through hole to form coatings on the coating area of the curved screen assembly. The curved-screen shielding device can provide accurate shielding and form coating at an accurate position of the curved screen assembly.

19 Claims, 9 Drawing Sheets

(56) References Cited

FOREIGN PATENT DOCUMENTS

| CN | 110699671 | A | * | 1/2020 | ......... C23C 16/4581 |
|----|-----------|---|---|--------|------------------------|
| CN | 210252790 | U |   | 4/2020 | |
| DE | 202008004228 | U1 |  | 5/2008 | |

OTHER PUBLICATIONS

PCT International Search Report and Written Opinion issued in International Patent Application No. PCT/CN2021/134979, mailed Mar. 1, 2022.

* cited by examiner

A-A

B-B

C

D

E-E

F-F

CURVED-SCREEN SHIELDING DEVICE

CROSS-REFERENCE TO RELATED APPLICATIONS

This application is a National Stage application under 35 U.S.C. § 371 of International Patent Application No. PCT/CN2021/134979, filed on Dec. 2, 2021, which claims the priority to Chinese Patent Application No. 202011575625.2, filed on Dec. 28, 2020, both of which are incorporated herein by reference.

TECHNICAL FIELD

The present disclosure relates to a coating device, and more particularly, to a curved-screen shielding device during a coating process.

BACKGROUND

In recent years, with the rapid development of coating technology, especially the vapor deposition technology, coating technology has become a hot spot to improve performances of electronic products. Coating technology can bring properties to electronic products such as strong anti-drop capabilities, excellent scratch and wear resistance, good heat dissipation, waterproofness, underwater electrification resistance, and corrosion resistance. Currently, plasma chemical vapor deposition technology is broadly used. Plasma can be generated under an electric field. Utilizing the plasma, a chemical reaction may happen between gaseous substances which contain atoms constituting a film layer, so as to form a protective film on surfaces of products.

With the continuous improvement of coating technology and increasing requirements for products, more and more products need coatings. Moreover, to-be-coated areas are also becoming more and more complex with the diversification of products.

In conventional coating processes for liquid crystal display modules on mobile phones and the like, MS adhesive protection technology is usually used for waterproof curved-screen assembly. During the coating process, once the MS adhesive falls off, there is no protection on the product to be coated. In addition, MS adhesive has a certain volume of its own, which is not favorable for an assembly process before the coating process.

SUMMARY

In one aspect of the present disclosure, a curved-screen shielding device is provided, which is used to provide shielding for a curved screen assembly during a coating process. The curved-screen shielding device can provide an accurate positioning for coatings on the curved screen assembly, so that a corresponding coating can be performed on the accurate position of the curved screen assembly.

In another aspect of the present disclosure, the curved-screen shielding device can prevent a coating monomer from reaching other areas of the curved screen assembly during a coating process for the curved screen assembly, thereby improving the coating efficiency of the curved screen assembly.

In another aspect of the present disclosure, the curved-screen shielding device includes multiple protective structures through which the coating monomer can be effectively blocked from penetrating into the curved screen assembly from a left side and a right side thereof.

In another aspect of the present disclosure, the curved-screen shielding device can lock the curved screen assembly therein, so as to avoid the curved screen assembly to fall off during a coating process, which may further improve a working stability of the curved-screen shielding device.

In another aspect of the present disclosure, the curved-screen shielding device can shield the curved screen assembly by an upper template and a lower template which are coupled. On one hand, it can improve a shielding performance for the curved screen assembly. On the other hand, it is convenient to operate for a user.

In another aspect of the present disclosure, the curved-screen shielding device includes flexible pads. On one hand, the flexible pads can enhance the protection for the curved screen assembly during installation. On the other hand, the flexible pads can further improve the waterproof performance of the curved-screen shielding device.

In another aspect of the present disclosure, at least one first through hole is configured on the surface of the curved-screen shielding device, and the structure of the at least one first through hole is adjustable to control the coating monomer to reach a coating area, thereby improving the coating efficiency of the curved screen assembly.

In another aspect of the present disclosure, the first through holes are configured in an area corresponding to the coating area of the curved screen assembly, and the first through holes communicate with each other, so that the coating monomer can effectively flow through the first through holes, thereby improving the coating efficiency and coating uniformity.

In another aspect of the present disclosure, the curved-screen shielding device is provided with a keep-space in a tail area of the components of a product, so as to effectively shield the curved screen assembly which is not crushed.

According to some embodiment of the present disclosure, a curved-screen shielding device is provided for shielding a curved screen assembly during a coating process. The curved-screen shielding device includes at least one template sleeve and at least one flexible sleeve, a flexible sleeve includes a first accommodation space, and a template sleeve includes a second accommodation space. The curved screen assembly can be accommodated in the first accommodation space, and the flexible sleeve can be accommodated in the second accommodation space. At least one first through hole is configured at a corresponding position of the template sleeve and the flexible sleeve, and a coating monomer can reach a coating area of the curved screen assembly through the at least one first through hole to form coatings on the coating area of the curved screen assembly.

According to some embodiment, the flexible sleeve includes at least one first flexible pad and at least one second flexible pad. A first flexible pad and a second flexible pad can be tightly coupled, so that the coating monomer cannot enter the first accommodation space through a leak between the first flexible pad and the second flexible pad.

According to some embodiment, the first flexible pad and the second flexible pad are tightly coupled by a concave-convex structure.

According to some embodiment, the first flexible pad includes at least one first convexity and at least one first concavity, and the at least one first convexity and the at least one first concavity are respectively configured along circumferential edges of the first flexible pad. The second flexible pad includes at least one second convexity and at least one second concavity, and the at least one second convexity and the at least one second concavity are respectively configured along circumferential edges of the second flexible pad. A first convexity and a second concavity match with each other, and a first concavity and a second convexity match with each other, so that the first flexible pad and the second flexible pad can be tightly coupled by the first convexity, the first concavity, the second convexity, and the second concavity.

According to some embodiment, the first convexity, the first concavity, the second convexity, and the second concavity take shapes of rectangle, respectively.

According to some embodiment, the second flexible pad includes a stop component, and the stop component is configured around an inner side of the second flexible pad to provide positioning and fastening surrounding the periphery of the curved screen assembly.

According to some embodiment, the first accommodation space matches with the curved screen assembly in shape and size, so that the curved screen assembly can be exactly accommodated in the first accommodation space.

According to some embodiment, the curved screen assembly includes at least one electronic component, and the first flexible pad further includes at least one keep-space configured above the at least one electronic component, so that the at least one electronic component of the curved screen assembly is not crushed by the curved-screen shielding device during the coating process.

According to some embodiment, the first flexible pad is made of silicon rubber with a Shore hardness of 50, and the second flexible pad is made of silicon rubber with a Shore hardness of 30.

According to some embodiment, the first flexible pad and the second flexible pad are provided with a plurality of gas holes respectively.

According to some embodiment, the template sleeve includes at least one first template and at least one second template, and a first template and a second template can be tightly coupled, so that the coating monomer cannot enter the second accommodation space through a leak between the first template and the second template.

According to some embodiment, the first template includes at least one third concavity, and the second template includes at least one third convexity. The at least one third concavity is configured along circumferential edges of the first template, and the at least one third convexity is configured along circumferential edges of the second template. The at least one third concavity and the at least one third convexity correspond to each other in position so that the first template and the second template can be tightly coupled by the at least one third concavity and the at least one third convexity.

According to some embodiment, the at least one third concavity and the at least one third convexity take shapes of rectangle respectively.

According to some embodiment, the first template and the second template are respectively made of epoxy.

According to some embodiment, the second accommodation space tightly matches with the flexible sleeve.

According to some embodiment, the first template and the second template are tightly connected by magnetic attraction.

According to some embodiment, a plurality of magnets with different polarities are configured at corresponding positions on the periphery of the first template and on the periphery of the second template, so as to realize an automatic attraction connection between the first template and the second template.

According to some embodiment, the first template and the second template are tightly connected by screws.

According to some embodiment, the at least one first through hole is configured on the first template and on the first flexible pad and is configured above the coating area, so that the coating monomer can directly reach the coating area through the at least one first through hole.

According to some embodiment, the at least one first through hole includes a plurality of small through holes, and a channel is configured between the first flexible pad and the coating area of the curved screen assembly. The channel communicates with the plurality of small through holes, so that the plurality of small through holes communicate with each other, and the coating monomer can flow along the channel after entering through the plurality of small through holes, thereby realizing a uniform coating on the coating area.

According to some embodiment, the plurality of small through holes have elliptical shapes.

According to some embodiment, the second template is provided with a second through hole, and the position of the second through hole does not overlap with the position of the plurality of gas holes, so that the coating monomer cannot enter the first accommodation space through the second through hole.

According to some embodiment, the first template and the first flexible pad are sealed and fixed, and the second template and the second flexible pad are sealed and fixed.

According to some embodiment, a height of the channel ranges from 0 mm to 3 mm.

According to some embodiment, a height of the channel is 2 mm.

According to some embodiment, a width of the coating area ranges from 0 mm to 1.5 mm.

According to some embodiment, a width of the coating area is 0.9 mm.

DETAILED DESCRIPTION

Figure 1:
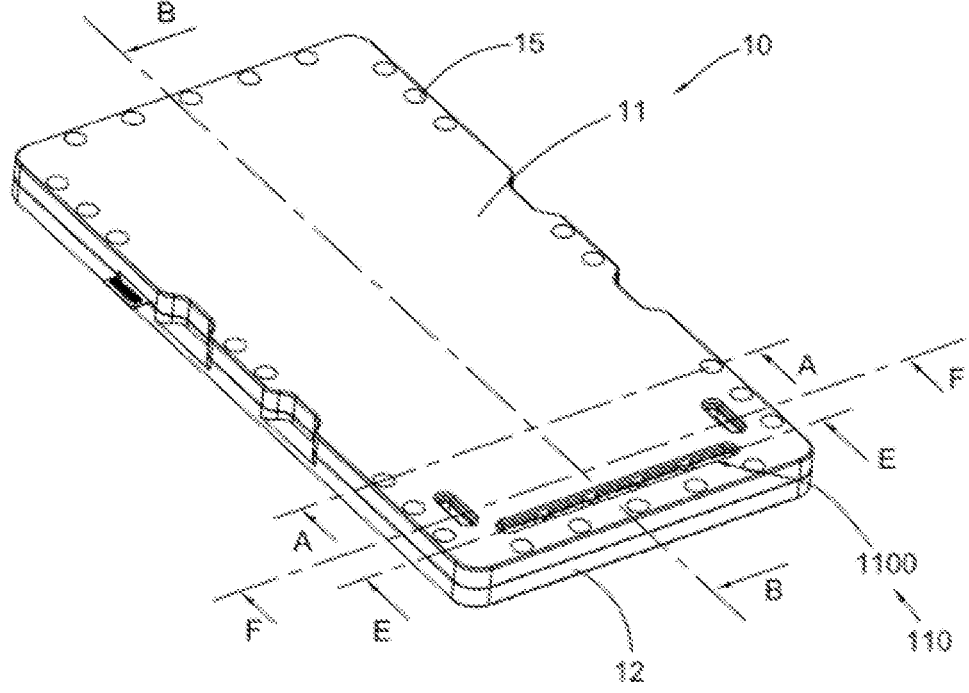
FIG. 1 schematically illustrates a three-dimensional structural diagram of an embodiment of the curved-screen shielding device according to the present disclosure.

The following description serves to disclose the disclosure to enable those skilled in the art to practice the present disclosure. The embodiments in the following description are only for exemplification. Those skilled in the art may think of other obvious variations. The basic principles of the present disclosure as defined in the following description may be applied to other embodiments, variations, modifications, equivalents, and other technical solutions without departing from the scope of the present disclosure.

Those skilled in the art will appreciate that, in the disclosure of the present disclosure, the terms "longitudinal", "transverse", "upper", "lower", "front", "rear", "left", "right", "vertical", "horizontal", "top", "bottom", "inner", "outer" and the like indicate azimuth or positional relationships based on the azimuth or positional relationships shown in the drawings. It is only intended to facilitate the description and simplify the description, and not to indicate or imply that the apparatus or element referred to must have a particular orientation, be constructed and operated in a particular orientation, so the above-mentioned terms are not to be construed to limit the present disclosure.

It will be appreciated that the term "a", "an", or "one" is to be understood as "at least one" or "one or more", i.e., in one embodiment, the number of one element may be one and in another embodiment the number of one element may be multiple, and that the term "a", "an", or "one" is not to be construed to limit the number.

In the description of this specification, the description referring to the terms "one embodiment", "some embodiments", "examples", "specific examples", or "some examples" means that the specific features, structures, materials, or characteristics described in connection with the embodiments or examples are included in at least one embodiment or example of the present disclosure. In this specification, the schematic expression of the above terms is not necessarily directed to the same embodiments or examples. Furthermore, the specific features, structures, materials, or characteristics described may be combined in any suitable manner in any one or more embodiments or examples. In addition, without contradiction, those skilled in the art can combine and combine the different embodiments or examples described in this specification and the features of different embodiments or examples.

Referring to FIG. 1 to FIG. 13, a curved-screen shielding device 10 used to provide shielding for a curved screen assembly 20 is provided. The curved-screen shielding device 10 includes at least one template sleeve and at least one flexible sleeve. A flexible sleeve includes a first accommodation space 130, and a template sleeve includes a second accommodation space 140. The curved screen assembly 20 can be accommodated in the first accommodation space 130 formed in the flexible sleeve, and the flexible sleeve can be accommodated in the second accommodation space 140 formed in the template sleeve. At least one first through hole

110 is configured at a corresponding position of the template sleeve and the flexible sleeve, and a coating monomer can reach a coating area 200 of the curved screen assembly 20 through the at least one first through hole 110, so that the curved-screen shielding device 10 can provide openings for coating while shielding the curved screen assembly 20.

Figure 2:
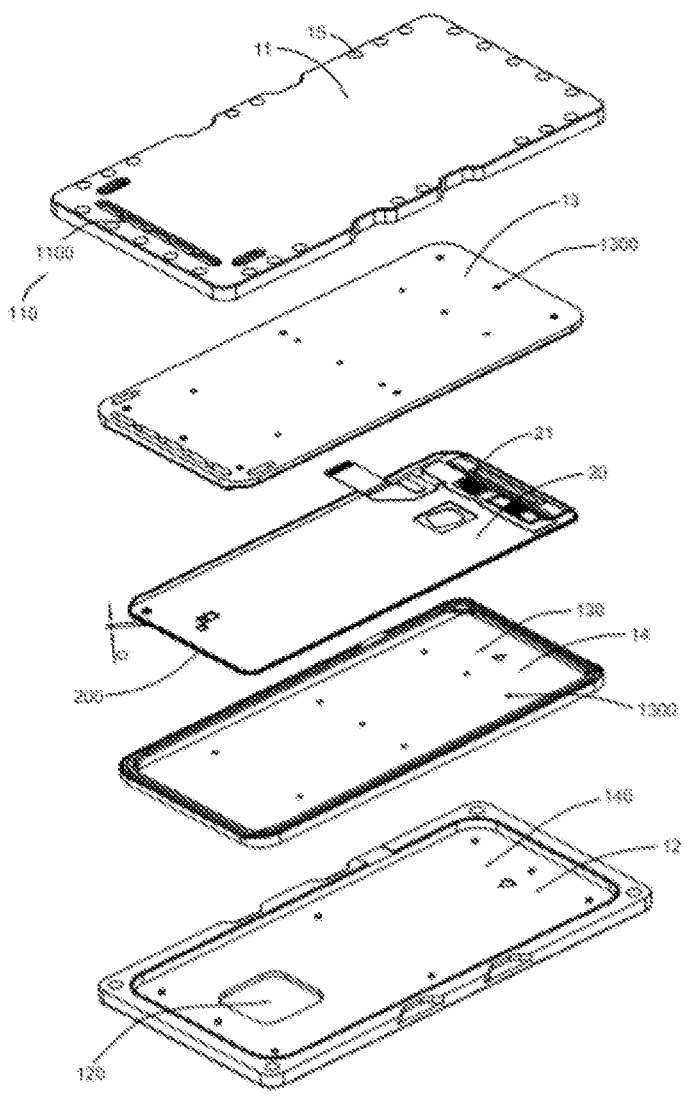
FIG. 2 schematically illustrates an exploded structural diagram of an embodiment of the curved-screen shielding device according to the present disclosure.

Specifically, referring to FIG. 2, the curved-screen shielding device 10 includes at least one first template 11, at least one second template 12, at least one first flexible pad 13 and at least one second flexible pad 14. A first flexible pad 13 and a second flexible pad 14 can be coupled with each other to form the flexible sleeve having a first accommodation space 130, and the curved screen assembly 20 can be placed in the first accommodation space 130. The first flexible pad 13 and the second flexible pad 14 can be tightly coupled and sealed. The first template 11 and the second template 12 can be tightly coupled to form the template sleeve having the second accommodation space 140, and the first flexible pad 13 and the second flexible pad 14 can be tightly pressed and coupled in the second accommodation space 140.

Figure 3:
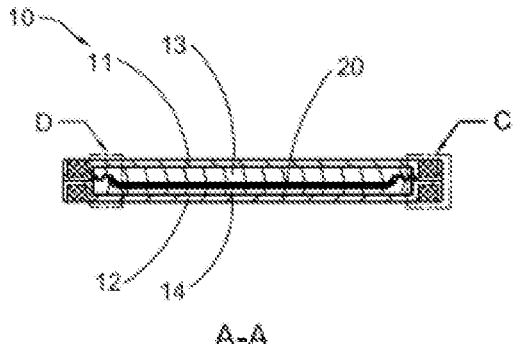
FIG. 3 schematically illustrates a cross-sectional structural diagram along the A-A direction in FIG. 1.
Figure 4:
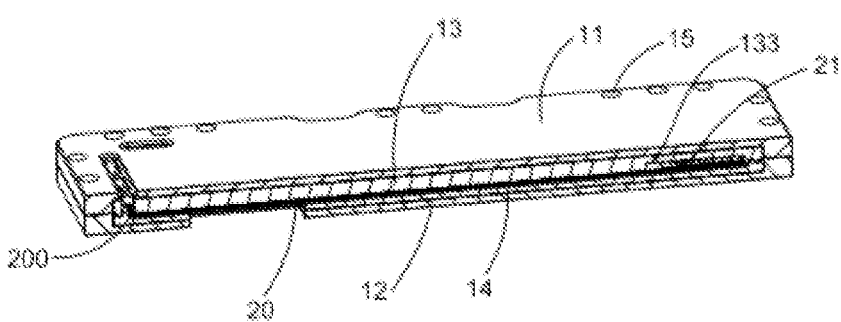
FIG. 4 schematically illustrates a cross-sectional structural diagram along the B-B direction in FIG. 1.
Figure 5:
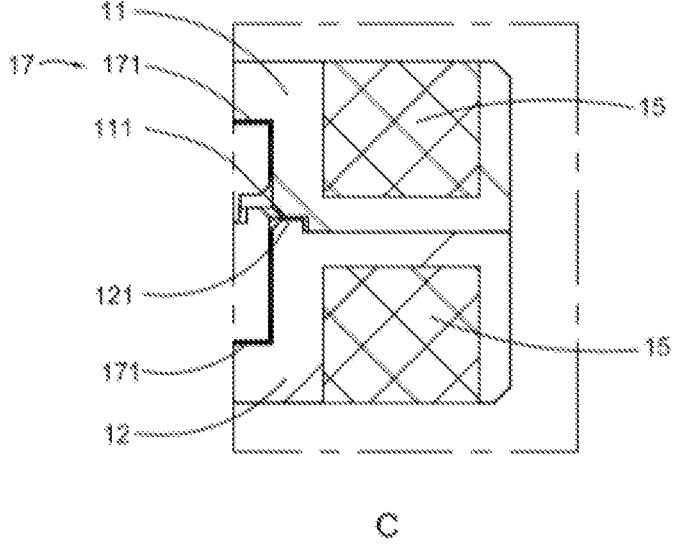
FIG. 5 schematically illustrates a diagram of the enlarged structure at C in FIG. 3.

Specifically, referring to FIG. 3 to FIG. 5, the first accommodation space 130 formed by the first flexible pad 13 and the second flexible pad 14 matches with the curved screen assembly 20 in shape, size and volume, so that the curved screen assembly 20 can be exactly accommodated in the first accommodation space 130.

According to some embodiment of the present disclosure, referring to FIG. 5, the first flexible pad 13 and the second flexible pad 14 are coupled with each other by a concave-convex structure so as to seal the first accommodation space 130.

Further, the first flexible pad 13 includes a first convexity 131 and a first concavity 132, and the second flexible pad 14 includes a second concavity 141 and a second convexity 142. The first convexity 131 and the second concavity 141 match with each other, and the first concavity 132 and the second convexity 142 match with each other, so that the first flexible pad 13 and the second flexible pad 14 can be coupled to seal the first accommodation space 130.

The second flexible pad 14 includes at least one first stop component 143 which extends from the second convexity 142 and communicates with the first accommodation space 130, so that the outer peripheral of the edge of the curved screen assembly 20 can be coupled with the first stop component 143.

In view of above, the curved screen assembly 20 can be accommodated in the first accommodation space 130 formed by the first flexible pad 13 and the second flexible pad 14. The first flexible pad 13 and the second flexible pad 14 can be coupled by the mutual cooperation of the first convexity 131, the first concavity 132, the second convexity 142, the second concavity 141 and the first stop component 143, so as to achieve the waterproof and penetration resistance effect, thereby preventing the coating monomer from reaching the curved screen assembly 20 through a leak between the first flexible pad 13 and the second flexible pad 14.

It should be noted that, in the above-mentioned embodiments of the present disclosure, the first convexity 131, the first concavity 132, the second convexity 142 and the second concavity 141 take shapes of rectangle respectively, so as to realize coupling the first flexible pad 13 with the second flexible pad 14.

In addition, those skilled in the art can adjust the coupling structure between the first flexible pad 13 and the second flexible pad 14 according to actual situations, for example, the first flexible pad 13 and the second flexible pad 14 are configured in a triangular zigzag coupling or the like. In other words, on the basis of the present disclosure, those adopt the same or similar technical solutions, solve the same or similar technical problems, and achieve the same or similar technical effects are all within to the protection scope of the present disclosure, and the implementation of the present disclosure shall not be limited hereby.

According to some embodiment of the present disclosure, the first flexible pad 13 and the second flexible pad 14 are respectively made of silicone, but the specific implementation of the present disclosure is not limited thereto. The first flexible pad 13 can be made of silicon rubber with a Shore hardness of 50. The second flexible pad 14 can be made of silicone rubber with a Shore hardness of 30. Therefore, the first flexible pad 13 is relatively hard, so that after the curved screen assembly 20 is coated, the first flexible pad 13 is easy to separate from the first template 11. Correspondingly, the second flexible pad 14 is relatively soft, so that the second flexible pad 14 can fit the second template 12 relatively closely during the coating process, thus no leak between the second flexible pad 14 and the second template 12 is available for the coating monomer entering.

However, the embodiments of the present disclosure are not limited thereto. Those skilled in the art can adjust the specific materials of the first flexible pad 13 and the second flexible pad 14 according to actual situations, the specific materials of the first flexible pad 13 and the second flexible pad 14 may include, but not limited to silicone rubber, EVA, natural rubber, etc., which are all within the protection scope of the present disclosure Accordingly, the second accommodation space 140 formed by the first template 11 and the second template 12 is tightly matched with the flexible sleeve formed by the first flexible pad 13 and the second flexible pad 14, so that the first flexible pad 13 and the second flexible pad 14 are exactly accommodated in the second accommodation space 140 without increasing the volume of the first template 11 and the second template 12.

The first flexible pad 13 and the second flexible pad 14 are provided with a plurality of gas holes 1300 respectively, so that gases in the first accommodation space 130 formed by the first flexible pad 13 and the second flexible pad 14 can be exhausted after the curved screen assembly 20 is placed in the first accommodation space 130. Therefore, the tightness between the curved screen assembly 20 and the first accommodation space 130 can be increased, and the volume of the flexible sleeve can be reduced after the curved screen assembly 20 is placed in the first accommodation space 130.

Figure 6:
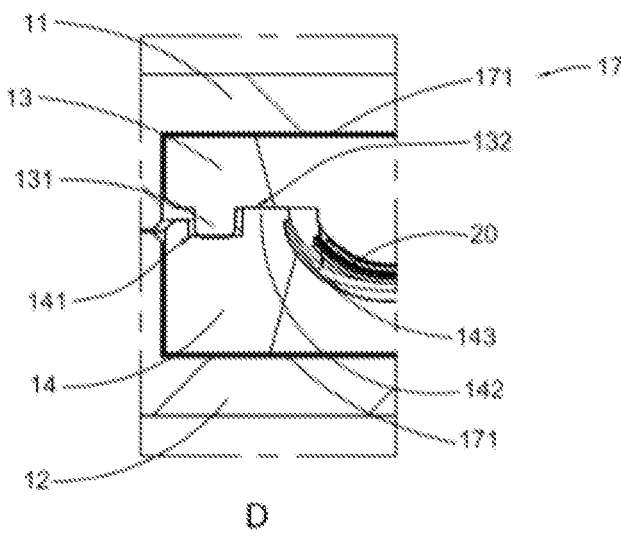
FIG. 6 schematically illustrates a diagram of the enlarged structure at D in FIG. 3.
Figure 7:
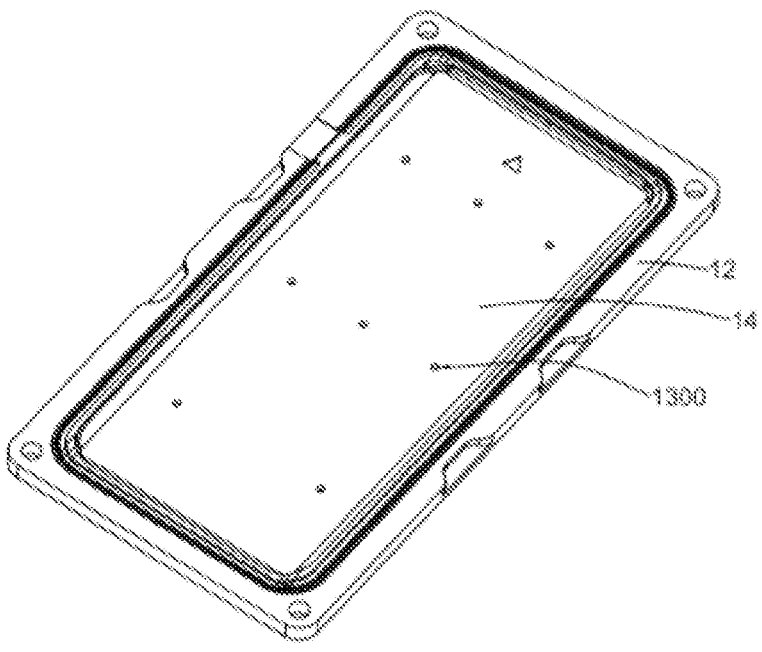
FIG. 7 schematically illustrates an assembly structural diagram of the second template and the second flexible pad of the curved-screen shielding device according to the present disclosure.

Further, referring to FIG. 6, the first template 11 and the second template 12 are configured to couple with each other by a concave-convex structure, so that the first template 11 and the second template 12 can be tightly coupled to prevent the coating monomer from entering the second accommodation space 140 through a leak between the first template 11 and the second template 12.

Specifically, the first template 11 includes a third concavity 111, and the second template 12 includes a third convexity 121. The third concavity 111 and the third convexity 121 match with each other to make the first template 11 and the second template 12 being coupled, and the penetration resistance performance of the template sleeve can be improved. Thus, the coating monomer is prevented from entering the second accommodation space 140 from the leak between the first template 11 and the second template 12.

According to some embodiment of the present disclosure, the third convexity 121 and the third concavity 111 are configured in rectangular structures which can mutually match. In addition, those skilled in the art can also change the structures of the third convexity 121 and the third concavity 111 according to actual situations, such as using a wavy structure, which also fall within the protection scope of the present disclosure. The embodiments of the present disclosure are not limited thereto.

It should be noted that, the outline of the curved screen assembly 20 makes a roughly rectangular shape, and the first template 11, the second template 12, the first flexible pad 13 and the second flexible pad 14 are similar as the curved screen assembly 20 in shapes. The first convexity 131 and the first concavity 132 of the first flexible pad 13 are respectively configured along circumferential edges of the first flexible pad 13, and the second convexity 142 and the second concavity 141 of the second flexible pad 14 are respectively configured along circumferential edges of the second flexible pad 14. Therefore, the first flexible pad 13 and the second flexible pad 14 can be coupled along circumferential edges thereof by the first convexity 131, the first concavity 132, the second convexity 142, and the second concavity 141. As a result, the penetration resistance performance of the flexible sleeve can be improved.

Correspondingly, the third concavity 111 of the first template 11 and the third convexity 121 of the second template 12 are also respectively configured along circumferential edges of the first template 11 and the second template 12, so that the first template 11 and the second template 12 can be tightly coupled by the third concavity 111 and the third convexity 121, and the penetration resistance performance of the template sleeve can be further improved.

Further, according to some embodiment of the present disclosure, the first stop component 143 is configured along circumferential edges of the second flexible pad 14, so that the curved screen assembly 20 can be fastened along circumferential edges thereof by the first stop component 143 of the second flexible pad 14. Further, the coating monomer can be prevented from entering the first accommodation space 130 through the leak between the first flexible pad 13 and the second flexible pad 14. Therefore, the curved screen assembly 20 accommodated in the first accommodation space 130 can be free of contamination by the coating monomer.

According to some embodiment of the present disclosure, a colloid 17 is configured between the second template 12 and the second flexible pad 14 to realize the sealing between the second template 12 and the second flexible pad 14. The gas holes 1300 is sealed by the colloid 17, so that the coating monomer cannot enter the leak between the second template 12 and the second flexible pad 14 through the second through hole 120, and the coating monomer cannot enter the first accommodation space 130 through the gas holes 1300 in the second flexible pad 14. Therefore, the curved screen assembly 20 is prevented from being contaminated by the coating monomer during the coating process, except for the coating area 200.

Similarly, the colloid 17 is also configured between the first template 11 and the first flexible pad 13, so that the first template 11 and the first flexible pad 13 can form an integral structure. With only one time of alignment, the installation for the first flexible pad 13 and the second flexible pad 14 can be completed.

According to some embodiment of the present disclosure, the colloid 17 is a 3M colloid 171.

Further, referring to FIG. 2, the second template 12 is provided with at least one second through hole 120, and the at least one second through hole 120 is configured on the second template 12. Therefore, the curved screen assembly 20 can be easily separated from the second flexible pad 14 by applying pressure to the at least one second through hole 120 after coating processes, realizing the separation of the curved screen assembly 20 and the second flexible pad 14.

It should be noted that the position of the second through hole 120 does not overlap with the position of the gas holes 1300. The second template 12 can be tightly connected with the second flexible pad 14 by the colloid 17. Therefore, the coating monomer cannot enter the gas holes 1300 through the second through hole 120, and the coating monomer cannot enter the first accommodation space 130 through the gas holes 1300.

The separation modes of the curved screen assembly 20 and the second flexible pad 14 are not limited in embodiments of the present disclosure, for example, the curved screen assembly 20 and the second flexible pad 14 can be sequentially manually separated from the second template 12 through the second through hole 120, which still falls into the protection scope of the present disclosure.

Moreover, those skilled in the art can adjust the structures and positions of the gas holes 1300 and the second through hole 120 according to actual situations, or even cancel the structures of the gas holes 1300 and the second through hole 120. Coating on the curved screen assembly 20 can still be achieved. Embodiments of the present disclosure are not limited to the above disclosure. On the basis of the present disclosure, those adopt the same or similar technical solutions and solve the same or similar technical problems are all within to the protection scope of the present disclosure.

According to some embodiment of the present disclosure, the first template 11 and the second template 12 are respectively made of epoxy. Epoxy has good dimensional stability and adhesion. An adhesion performance of the first template 11 and the second template 12 and an adhesion performance of the first flexible pad 13 and the second flexible pad 14 can be improved by configuring epoxy plates as the first template 11 and the second template 12. As a result, the coating monomer is prevented from entering the second accommodation space 140 through the second through hole 120. Therefore, a shielding stability of the curved-screen shielding device 10 can be further improved during a coating process for the curved screen assembly 20 according to the present disclosure.

Further, the first template 11 and the second template 12 are respectively FR-4 epoxy plates. In addition, the first template 11 and the second template 12 are respectively configured with a relatively flat structure with a large size, so as to lower processing difficulty of the first template 11 and the second template 12, to improve the coating accuracy of the curved screen assembly 20, and to improve the structural strength of the first template 11 and the second template 12.

As a variant of the above embodiments of the present disclosure, those skilled in the art can also determine the material, shape and size of the first template 11 and the second template 12 according to actual situations, for example, aluminum alloy material. On the basis of the present disclosure, those adopt the same or similar technical solutions, solve the same or similar technical problems, and achieve the same or similar the technical effects are all within to the protection scope of the present disclosure, and the implementation of the present disclosure shall not be limited hereby.

Figure 9:
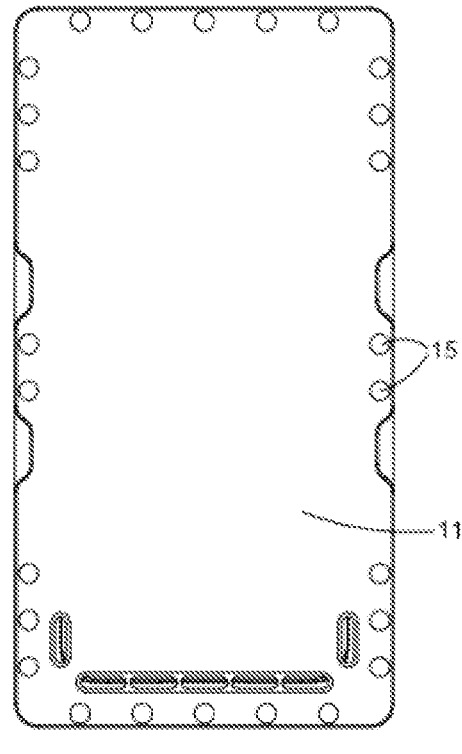
FIG. 9 schematically illustrates a diagram of the front view of the magnetic attraction structure in an embodiment of the curved-screen shielding device according to the present disclosure.

Further, referring to FIG. 9, according to some embodiment of the present disclosure, the first template 11 and the second template 12 are connected with each other by magnetic attraction, so that the first template 11 and the second template 12 have an automatic attraction function, ensuring that the curved-screen shielding device 10 can provide stable shielding protection for the curved screen assembly 20 without falling off during the coating process for the curved screen assembly 20.

Specifically, referring to FIG. 9, a plurality of magnets 15 with different polarities are configured at corresponding positions on the periphery of the first template 11 and on the periphery of the second template 12, so that the first template 11 and the second template 12 can realize an automatic attraction under the magnetic effect of the plurality of magnets 15. A tight connection can be realized between the first template 11 and the second template 12.

Since the magnets 15 can be configured on the first template 11 and the second template 12 in advance, the first template 11 and the second template 12 can be automatically attracted during a connection process due to a principle of magnetic attraction. There is no need for operators to connect the first template 11 with the second template 12 additionally. Therefore, it is possible to increase the preparation time of the curved screen assembly 20 before coating, thereby further improving the coating efficiency of the curved screen assembly 20.

Figure 10:
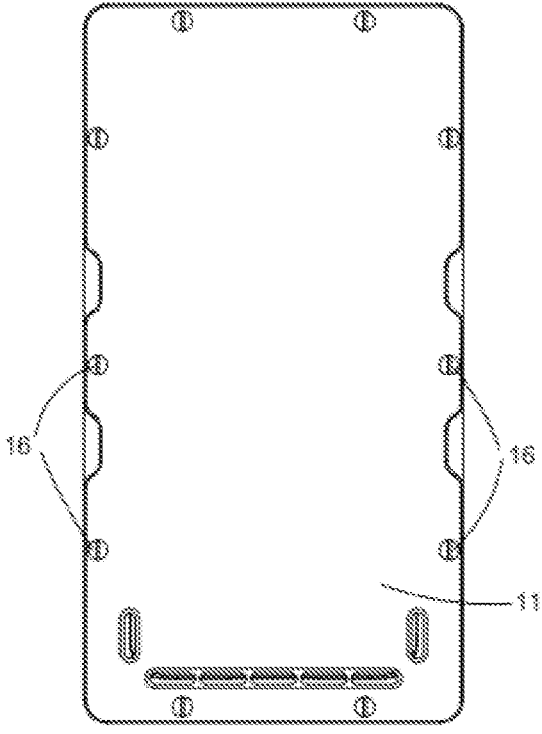
FIG. 10 schematically illustrates a diagram of the front view of the connection by screws in an embodiment of the curved-screen shielding device according to the present disclosure.

According to some embodiment of the present disclosure, referring to FIG. 10, the first template 11 and the second template 12 are connected by screws 16. However, the embodiments of the present disclosure are not limited thereto, and those skilled in the art can determine the connection mode between the first template 11 and the second template 12 according to actual situations, the connection mode may include, but not limited to thread locking or snap locking, which are all within the protection scope of the present disclosure.

Figure 8:
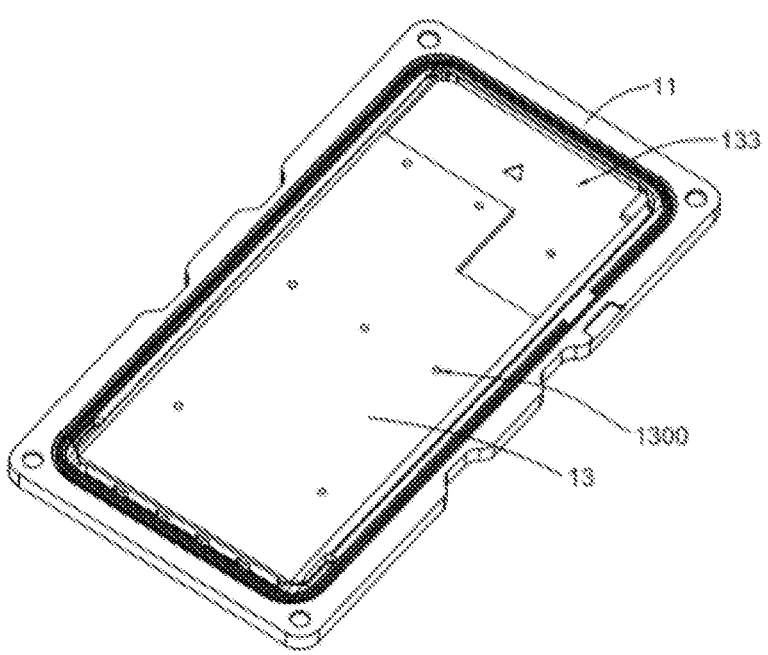
FIG. 8 schematically illustrates an assembly structural diagram of the first template and the first flexible pad of the curved-screen shielding device according to the present disclosure.

Further, referring to FIG. 8, the shape of the first accommodation space 130 formed by the first flexible pad 13 and the second flexible pad 14 is consistent with the shape of the curved screen assembly 20, and the first flexible pad 13 is provided with a keep-space 133 at a position corresponding to the tail of the curved screen assembly 20. The keep-space 133 can prevent the electronic components 21 from being crushed while the flexible sleeve and the template sleeve are tightly connected. Therefore, the curved-screen shielding device 10 of the present disclosure can prevent the electronic components 21 at the tail of the curved screen assembly 20 from being damaged while providing shielding protection from penetration.

Referring to FIG. 2, a first through hole 110 is configured at a corresponding position of the first template 11 and the first flexible pad 13, and the position of the first through hole 110 is consistent with the position of the coating area 200 of the curved screen assembly 20. The coating monomer can reach the coating area 200 of the curved screen assembly 20 through the first through hole 110 to complete the coating process.

Figure 12:
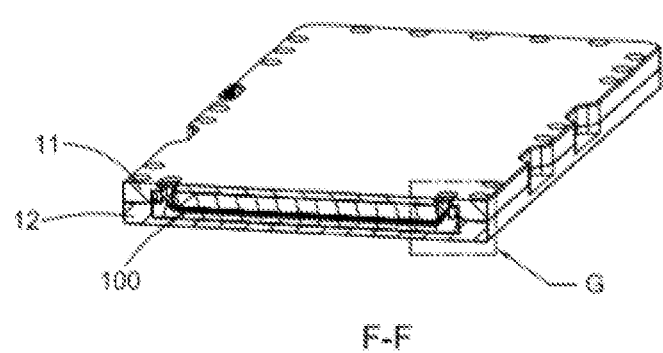
FIG. 12 schematically illustrates a cross-sectional structural diagram along the F-F direction in FIG. 1.
Figure 13:
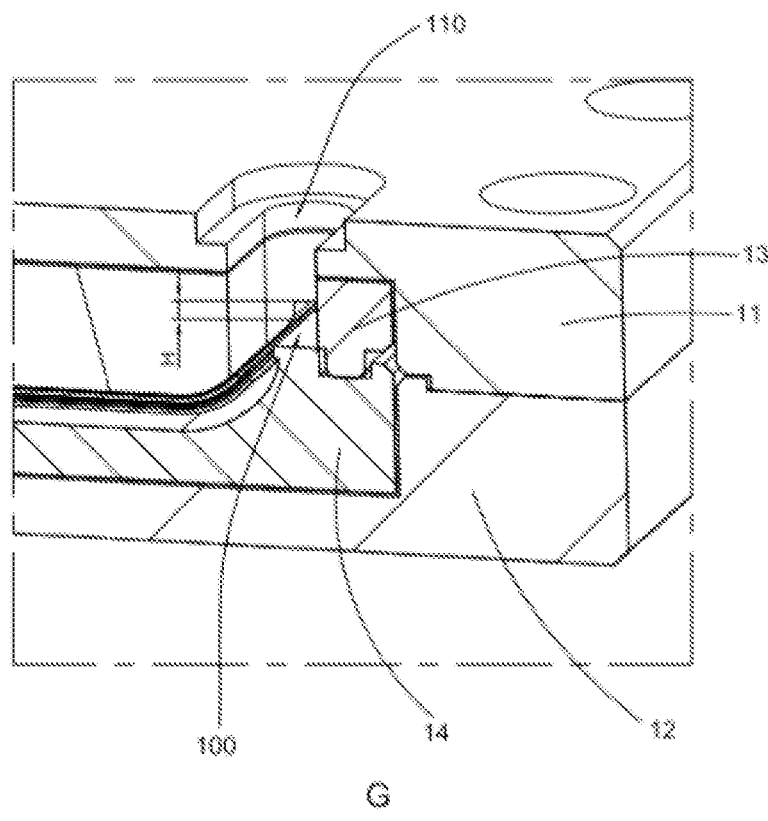
FIG. 13 schematically illustrates a diagram of the enlarged structure at G in FIG. 12.

Specifically, referring to FIG. 12 and FIG. 13, according to some embodiment of the present disclosure, the first through hole 110 includes a plurality of small through holes 1100, and a channel 100 is configured between the first flexible pad 13 and the coating area 200 of the curved screen assembly 20. The channel 100 communicates with the plurality of small through holes 1100, so that the plurality of small through holes 1100 communicate with each other, and the coating monomer can flow along the channel 100 after entering through the plurality of small through holes 1100, thereby realizing a uniform coating on the coating area 200 of the curved screen assembly 20.

Figure 11:
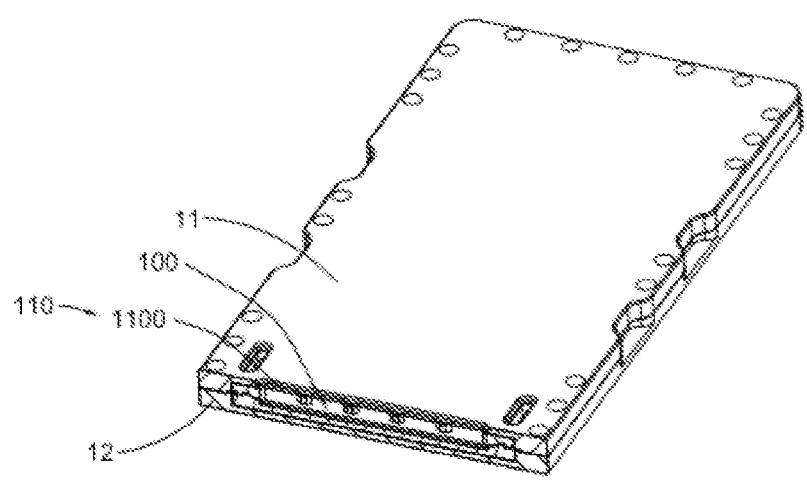
FIG. 11 schematically illustrates a cross-sectional structural diagram along the E-E direction in FIG. 1.

According to some embodiment of the present disclosure, referring to FIG. 11, the small through holes 1100 have elliptical shapes. The section of the first template 11 and the first flexible pad 13 is M-shaped at the position of the small through holes 1100. Therefore, more reliable protection can be achieved in structure. The process offset is able to have an error of 0.2 mm. Therefore, the processing difficulty can be lowered.

According to some embodiment of the present disclosure, a height H of the channel 100 ranges from 0 mm to 3 mm.

According to some embodiment of the present disclosure, the channel 100 has a height H of 2 mm, so as to improve the fluidity of the coating monomer. The coating area 200 of the curved screen assembly 20 can be uniformly coated while ensuring the volume of the curved-screen shielding device 10 not increasing excessively. On the basis of the present disclosure, those adopt the same or similar technical solutions, solve the same or similar technical problems, and achieve the same or similar the technical effects are all within to the protection scope of the present disclosure, and the implementation of the present disclosure shall not be limited hereby.

According to some embodiment of the present disclosure, a width D of the coating area 200 of the curved screen assembly 20 ranges from 0 mm to 1.5 mm. In some embodiment, the width D is 0.9 mm.

The curved-screen shielding device 10 of the present disclosure provides the template sleeve formed by the first template 11 and the second template 12 and the flexible sleeve formed by the first flexible pad 13 and the second flexible pad 14, so that the front glass surface and the back copper foil surface of the curved screen assembly 20 are not coated by the coating monomer during the coating process. The coating monomer can only reach the coating area 200 of the curved screen assembly 20 from the first through hole 110. Only the coating area 200 of the curved screen assembly 20 is coated. In other words, the curved-screen shielding device 10 as described in the present disclosure not only enables the coating monomer to accurately coat an edge area with a width of only 0.9 mm of the curved screen assembly 20, but also ensures that the curved screen 20 accurately is not contaminated or damaged in appearance during the coating process.

Accordingly, by adopting the concave-convex structures of the first flexible pad 13 and the second flexible pad 14 and adopting the concave-convex structures of the first template 11 and the second template 12, the curved-screen shielding device 10 of the present disclosure can improve performance of preventing the coating monomer or sweat or other liquids from entering the first accommodation space 130 during coating processes.

In addition, the first template 11 and the second template 12 are automatically mutually attracted by magnetism. The curved-screen shielding device 10 can be prevented from falling off during the coating process of the curved screen assembly 20. Therefore, the curved screen assembly 20 can be provided with a stable shielding protection.

The following is a further brief explanation of the working process of the curved-screen shielding device 10 according to the figures.

The coating area 200 of the curved screen assembly 20 needs to be coated. Firstly, placing the curved screen assembly 20 in the first accommodation space 130 of the flexible sleeve of the curved-screen shielding device 10, and ensuring the end of electronic components disposed at the tail of the curved screen assembly 20 facing the side corresponding to the keep-space 133 inside the flexible sleeve.

Then, correspondingly coupling the first convexity 131, the first concavity 132, the second convexity 142, and the second concavity 141 to realize a tight connection of the first flexible pad 13 and the second flexible pad 14. Then, coupling the first template 11 with the second template 12 of the template sleeve at corresponding position of the third convexity 121 with the third concavity 111, so as to achieve the shielding for the curved screen assembly 20.

During operation, other areas of the curved screen assembly 20 have already been shielded by the curved-screen shielding device 10. The coating monomer can only enter the coating area 200 of the curved screen assembly 20 through the first through hole 110 of the curved-screen shielding device 10 to achieve coating on the curved screen assembly 20. Since the curved-screen shielding device 10 includes concave-convex structures configured in the template sleeve and the flexible sleeve, no leak between the first template 11 and the second template 12 is available for the coating monomer entering the first accommodation space 130, and cannot enter the first accommodation space 130 through the leak between the first flexible pad 13 and the second flexible pad 14 during the coating process. Therefore, the coating monomer cannot contaminate other areas except for the coating area 200 of the curved screen assembly 20 during the coating process.

Those skilled in the art will appreciate that, the embodiments of the present disclosure shown in the foregoing description and the accompanying drawings are by way of example only and are not intended to limit the present disclosure. The advantages of the present disclosure have been completely and effectively realized. The functionality and structural principles of the present disclosure have been shown and illustrated in the embodiments, and embodiments of the disclosure may be varied or modified without departing from the principles described herein.

What is claimed is:

1. A curved-screen shielding device used to provide shielding for a curved screen assembly during a coating process, comprising:

at least one template sleeve and at least one flexible sleeve, wherein a flexible sleeve comprises a first accommodation space, a template sleeve comprises a second accommodation space, the curved screen assembly can be accommodated in the first accommodation space, the flexible sleeve can be accommodated in the second accommodation space, at least one first through hole is configured at a corresponding position of the template sleeve and the flexible sleeve, and a coating monomer can reach a coating area of the curved screen assembly through the at least one first through hole to form coatings on the coating area of the curved screen assembly;

wherein the template sleeve comprises at least one first template and at least one second template, and a first template and a second template can be tightly coupled, so that the coating monomer cannot enter the second accommodation space through a leak between the first template and the second template.

2. The curved-screen shielding device according to claim 1, wherein the flexible sleeve comprises at least one first flexible pad and at least one second flexible pad, a first flexible pad and a second flexible pad can be tightly coupled, so that the coating monomer cannot enter the first accommodation space through a leak between the first flexible pad and the second flexible pad.

3. The curved-screen shielding device according to claim 2, wherein the first flexible pad and the second flexible pad are tightly coupled by a concave-convex structure.

4. The curved-screen shielding device according to claim 3, wherein the first flexible pad comprises at least one first convexity and at least one first concavity, the at least one first convexity and the at least one first concavity are respectively configured along circumferential edges of the first flexible pad, the second flexible pad comprises at least one second convexity and at least one second concavity, the at least one second convexity and the at least one second concavity are respectively configured along circumferential edges of the second flexible pad, a first convexity and a second concavity match with each other, and a first concavity and a second convexity match with each other, so that the first flexible pad and the second flexible pad can be tightly coupled by the first convexity, the first concavity, the second convexity, and the second concavity.

5. The curved-screen shielding device according to claim 4, wherein the second flexible pad comprises a stop component, and the stop component is configured around an inner side of the second flexible pad to provide positioning and fastening surrounding the periphery of the curved screen assembly.

6. The curved-screen shielding device according to claim 5, wherein the first accommodation space matches with the curved screen assembly in shape and size, so that the curved screen assembly can be exactly accommodated in the first accommodation space.

7. The curved-screen shielding device according to claim 6, wherein the curved screen assembly comprises at least one electronic component, and the first flexible pad further comprises at least one keep-space configured above the at least one electronic component, so that the at least one electronic component of the curved screen assembly is not crushed by the curved-screen shielding device during the coating process.

8. The curved-screen shielding device according to claim 7, wherein the first flexible pad is made of silicon rubber with a Shore hardness of 50, and the second flexible pad is made of silicon rubber with a Shore hardness of 30.

9. The curved-screen shielding device according to claim 1, wherein the first flexible pad and the second flexible pad are provided with a plurality of gas holes respectively.

10. The curved-screen shielding device according to claim 1, wherein the first template comprises at least one third concavity, the second template comprises at least one third convexity, the at least one third concavity is configured along circumferential edges of the first template, the at least one third convexity is configured along circumferential edges of the second template, and the at least one third concavity and the at least one third convexity correspond to each other in position so that the first template and the second template can be tightly coupled by the at least one third concavity and the at least one third convexity.

11. The curved-screen shielding device according to claim 10, wherein the second accommodation space tightly matches with the flexible sleeve.

12. The curved-screen shielding device according to claim 11, wherein the first template and the second template are tightly connected by magnetic attraction or screws.

13. The curved-screen shielding device according to claim 12, wherein a plurality of magnets with different polarities are configured at corresponding positions on the periphery of the first template and on the periphery of the second template, so as to realize an automatic attraction connection between the first template and the second template.

14. The curved-screen shielding device according to claim 12, wherein the at least one first through hole is configured on the first template and on the first flexible pad and is configured above the coating area, so that the coating monomer can directly reach the coating area through the at least one first through hole.

15. The curved-screen shielding device according to claim 14, wherein the at least one first through hole comprises a plurality of small through holes, a channel is configured between the first flexible pad and the coating area of the curved screen assembly, and the channel communicates with the plurality of small through holes, so that the plurality of small through holes communicate with each other, and the coating monomer can flow along the channel after entering through the plurality of small through holes, thereby realizing a uniform coating in the coating area.

16. The curved-screen shielding device according to claim 15, wherein the second template is provided with a second through hole, and the position of the second through hole does not overlap with the position of the plurality of gas holes, so that the coating monomer cannot enter the first accommodation space through the second through hole.

17. The curved-screen shielding device according to claim 16, wherein the first template and the first flexible pad are sealed and fixed, and the second template and the second flexible pad are sealed and fixed.

18. The curved-screen shielding device according to claim 17, wherein a height of the channel ranges from 0 mm to 3 mm.

19. The curved-screen shielding device according to claim 18, wherein a width of the coating area ranges from 0 mm to 1.5 mm.

* * * * *